A. BRAY.
SUPPORTING MEANS FOR GLOBES OF INVERTED INCANDESCENT GAS BURNERS AND LIKE FITTINGS.
APPLICATION FILED MAY 28, 1909.
986,432. Patented Mar. 14, 1911.
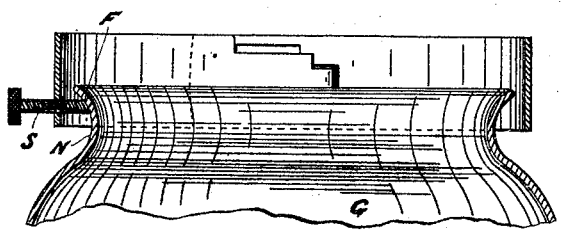
Fig. 1.
 
Fig. 2. Fig. 3.
 
Fig. 4. Fig. 5.
 
Fig. 6. Fig. 7.
 
Fig. 8. Fig. 9.
WITNESSES
W. P. Burks
John A. Percival
INVENTOR
Arthur Bray
BY

UNITED STATES PATENT OFFICE.

ARTHUR BRAY, OF LEEDS, ENGLAND.

SUPPORTING MEANS FOR GLOBES OF INVERTED INCANDESCENT GAS-BURNERS AND LIKE FITTINGS.

986,432.

Specification of Letters Patent.

Patented Mar. 14, 1911.

Application filed May 28, 1909. Serial No. 498,990.

*To all whom it may concern:*

Be it known that I, ARTHUR BRAY, a director of the firm of Geo. Bray & Co., Limited, of Bagby Works, Leicester Place, Leeds, in the county of York, England, gas-lighting engineer, subject of the King of Great Britain and Ireland, have invented certain new and useful Improved Supporting Means for Globes of Inverted Incandescent Gas-Burners and Like Fittings, of which the following is a specification.

This invention relates to improvements in supporting means for globes of inverted incandescent gas burners and like fittings.

The usual method of supporting the globes or like of inverted fittings, is to provide the gallery with a number of screws, which are tightened against the sides of the neck of the globe, and in some forms of fitting the gallery is in the form of a spring ring in order to allow for contraction and expansion. When the burners or fittings are placed in positions which are subject to vibration, the attaching screws are very apt to work loose, and finally allow the globe to fall from the gallery. Lock nuts have been used to prevent this, but such are naturally more costly than a plain screw or screws, and the lock nuts are seldom used for their purpose.

My object is to overcome the above disadvantage without adding materially to the cost of the attaching device, and to construct a screw attaching device, and arrange same in combination with the globe or like in such a manner that the downward action of the weight of the globe or like will prevent the said screw or screws from turning in their seating or threaded apertures under the influence of vibration.

In describing my invention in detail, reference is made to the accompanying sheet of drawings, similar letters indicating similar parts, in which—

Figure 1 represents a general view, partly in section, of a globe, gallery and attaching screw. Figs. 2 and 3 represent elevation and end view of one form of screw. Figs. 4 and 5 represent elevation and end view of another form of screw. Figs. 6 and 7 represent elevation and end view of another form of screw. Figs. 8 and 9 represent elevation and end view of another form of screw.

In carrying out my invention, while there are many forms in which my object may be attained, I have shown in the drawings examples which will be found to answer the purpose, the main feature being the construction of a screw S with a flat or flats F thereon, with which the neck N of the globe G will come in contact, and the weight of the globe will press on the flat on the screw and prevent the screw from turning under vibration. The flats F are by preference somewhat taper to fit the taper of the neck of the globe or the like, but where the neck is practically right angled, the flats may be straight as shown in Figs. 4 to 7.

What I claim as my invention is:—

In combination with a gallery, a globe provided with a neck portion, and globe supporting screws rotatably mounted in said gallery, said screws being provided with a flat globe engaging surface, the plane of which forms an angle with the plane of the head of the screw.

In witness whereof, I have hereunto set my hand, in the presence of two witnesses.

ARTHUR BRAY.

Witnesses:
 CLIVE WAUGH,
 HY. MUDD.

Copies of this patent may be obtained for five cents each, by addressing the "Commissioner of Patents, Washington, D. C."